J. C. RICK.
LEAD PIPE COUPLING.
APPLICATION FILED NOV. 27, 1908.

933,584.

Patented Sept. 7, 1909.

Witnesses
R. L. Farrington.
R. H. Butler.

Inventor
John C. Rick.
By H. C. Everett
Attorneys

UNITED STATES PATENT OFFICE.

JOHN C. RICK, OF CARNEGIE, PENNSYLVANIA.

LEAD-PIPE COUPLING.

933,584.

Specification of Letters Patent. Patented Sept. 7, 1909.

Application filed November 27, 1908. Serial No. 464,571.

*To all whom it may concern:*

Be it known that I, JOHN C. RICK, a citizen of the United States of America, residing at Carnegie, in the county of Allegheny and State of Pennsylvania, have invented certain new and useful Improvements in Lead-Pipe Couplings, of which the following is a specification, reference being had therein to the accompanying drawing.

This invention relates to a lead pipe coupling, and the object of my invention is the provision of simple and effective means, for establishing a non-leakable connection between a lead pipe and a wrought iron pipe.

I attain the above object by providing a coupling constructed along the lines of a union, an intermediate connecting member of a novel form being used to provide a continuous passage from a lead pipe to a wrought iron pipe or similar conduit.

The detail construction entering into the invention will be hereinafter described and claimed.

Figure 1:
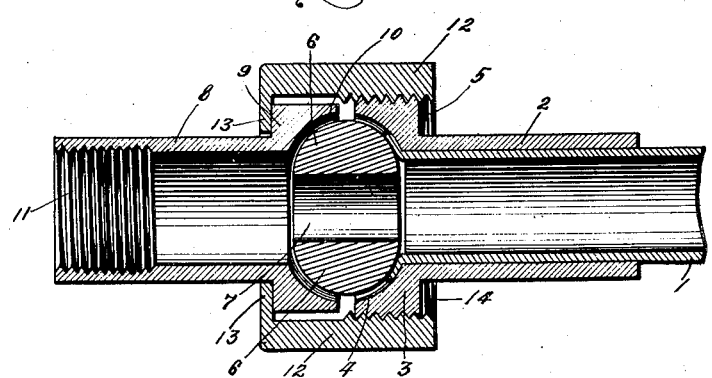
Figure 2:
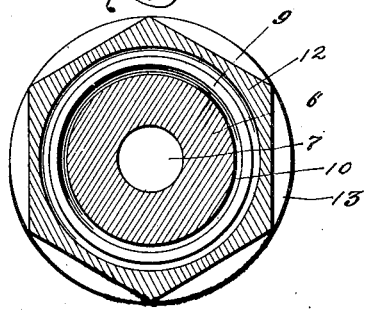

In the drawings, Figure 1 is a longitudinal sectional view of the coupling, and Fig. 2 is a cross sectional view of the same.

Referring to the drawings in detail, 1 designates a soft metal pipe having one end flared as at 5 and fitted upon the said pipe 1 is a coupling member 2 formed at one end with an exteriorly threaded collar 3 provided with a cavity or concave recess 4 in the face thereof and in the recess 4 projects the flared end of the pipe 1, the length of the flared end of the pipe 1 in longitudinal section being less than the depth of the recess 4.

The reference character 8 denotes a coupling member formed at one end with a collar 9 provided with a cavity or recess 10. The diameter of the collar 9 is less than the diameter of the collar 3 and the recess of the collar 9 opposes the recess of the collar 3. The member 8 at one end is formed with interior threads 11 whereby a pipe branch can be connected to the said member 8. The diameter of the recess 4 in the collar 3 is the same as that of the recess 10 in the collar 9. Interposed between the coupling members 2 and 8 is a connecting member 6 having a longitudinally extending bore 7 of less diameter than the inner diameter of the pipe 1 or the inner diameter of the coupling member 8. The connecting member 6 in plan is circular and in cross section is oval whereby the contour of said member will conform to the shape of the recess in the coupling members. The member 6 extends within the recess of the coupling member and engages the flared ends 5 of the pipe 1.

To connect the coupling members 2 and 8 together and to cause a snug engagement of the connecting member 6 with the wall of the recess 10 and the flaring end 5 of the pipe 1, a flanged sleeve or nut 12 is employed. The sleeve 12 has its inner face for a portion of its length provided with screw-threads which engage with the threads of the collar 3. The sleeve 12 extends over the collar 9 and is formed with a flange 13 which abuts against the collar 9 so that when the sleeve 12 is moved in one direction, engagement with the flange 13 with the collar 9 and the engagement of the threads of the sleeve with the threads of the collar 3 will draw the two coupling members together whereby in connection with the member 6 a tie joint, so as to prevent leakage, will be provided. If desired, a suitable packing can be interposed between the member 6 and the collar 9. The reduced diameter of the collar with respect to the diameter of the collar 3 allows for clearance when positioning the sleeve 12 upon the coupling members.

Having now described my invention, what I claim as new, is:—

In combination, a coupling member comprising a tubular section and an integral collar, said collar being formed with an inner recess adapted to be engaged by a connecting member oval shaped in cross-section, the outer face of said collar being formed cylindrical and provided with a right-angular shoulder, a second coupling member of like construction, said second coupling member being provided with external screw-threads, a flanged soft metal pipe in the second coupling member with the flanged end thereof located in the recessed collar of said second coupling member, said recess being so formed that the collar is provided with a sharp edge engaging the soft metal pipe, a member formed oval in cross-section having a bore of less diameter than the bores of the coupling members located between the recessed collars thereof, said member being adapted to force the flanged end of the soft metal pipe against the adjacent collar, and a flanged nut mounted on the first collar with the flange thereof engaging the right-angular shoulder thereof, the inner peripheral edge of said flange projecting inwardly of the plane of the outermost portion of the oval-shaped member, said nut being threaded on the second collar whereby the two collars will be forced toward each other with the line of strain of the tubular portions of said coupling-members fixed midway of the transverse thickness of the oval-shaped member.

In testimony whereof I affix my signature in the presence of two witnesses.

JOHN C. RICK.

Witnesses:
   Max H. Srolovitz,
   K. H. Butler.